United States Patent
Byström

(10) Patent No.: US 10,807,793 B2
(45) Date of Patent: Oct. 20, 2020

(54) LOGISTICS ARRANGEMENT AND METHOD FOR UNLOADING OBJECTS FROM A LOGISTICS STAND COMPRISING A PLURALITY OF LOGISTICS ARRANGEMENTS

(71) Applicant: ABSOLICON SOLAR COLLECTOR AB, Härnösand (SE)

(72) Inventor: Joakim Byström, Härnösand (SE)

(73) Assignee: ABSOLICON SOLAR COLLECTOR AB, Härnösand (SE)

( * ) Notice: Subject to any disclaimer, the term of this patent is extended or adjusted under 35 U.S.C. 154(b) by 0 days.

(21) Appl. No.: 16/635,746

(22) PCT Filed: Jul. 7, 2018

(86) PCT No.: PCT/SE2018/050749
§ 371 (c)(1),
(2) Date: Jan. 31, 2020

(87) PCT Pub. No.: WO2019/009799
PCT Pub. Date: Jan. 10, 2019

(65) Prior Publication Data
US 2020/0231377 A1    Jul. 23, 2020

(30) Foreign Application Priority Data
Jul. 7, 2017  (SE) ........................... 1730186

(51) Int. Cl.
*B65D 88/00*    (2006.01)
*B65D 88/12*    (2006.01)
(Continued)

(52) U.S. Cl.
CPC .......... *B65D 88/129* (2013.01); *B63B 25/002* (2013.01); *B63B 25/28* (2013.01);
(Continued)

(58) Field of Classification Search
CPC .. B65D 90/0073; B65D 88/123; B65D 85/02; B65D 85/20; B65D 85/54; B65D 85/62;
(Continued)

(56) References Cited

U.S. PATENT DOCUMENTS 3,045,831 A    7/1962  Pendergrast et al.
3,295,471 A    1/1967  Cook
(Continued)

FOREIGN PATENT DOCUMENTS

DE    131548 A1     7/1978
DE    29811801 U1   9/1998
(Continued)

OTHER PUBLICATIONS

Search Report issued in corresponding Swedish Application No. 1730186-2 dated Mar. 7, 2018.
(Continued)

*Primary Examiner* — Stephen T Gordon
(74) *Attorney, Agent, or Firm* — Patent Portfolio Builders PLLC

(57) ABSTRACT

The logistics arrangement comprises an arm adapted to be pivotably attached to a logistics stand. The arm comprises a support member adapted to carry an object, when the arm is substantially horizontally directed in a storage position, and a pivoting element adapted to pivotably attach the arm to the logistics stand, such that the arm is enabled to pivot between the storage position and a standby position where the arm is substantially vertically directed. The arm also comprises a stop member adapted to together with the logistics stand hold the arm in a storage position. The support member is connected with the stop member and the pivoting element, and the arm is configured to be forced into the standby position by an upwardly directed lift-movement of the another located object, during unload of the lower located (Continued)

object form the logistics stand. The invention also relates to a logistics stand comprising a plurality of logistics arrangements, a logistics system comprising a freight container and at least one logistics stand, and a method for unloading objects from a logistics stand.

6 Claims, 7 Drawing Sheets

(51) Int. Cl.
      *B65D 90/00*     (2006.01)
      *B63B 25/28*     (2006.01)
      *B63B 25/00*     (2006.01)
      *B65D 85/02*     (2006.01)
      *B65D 85/20*     (2006.01)
      *B65D 85/00*     (2006.01)
      *B65D 85/62*     (2006.01)
      *B60P 3/40*     (2006.01)

(52) U.S. Cl.
      CPC ............. *B65D 85/02* (2013.01); *B65D 85/20* (2013.01); *B65D 85/54* (2013.01); *B65D 85/62* (2013.01); *B65D 90/0073* (2013.01); *B60P 3/40* (2013.01)

(58) Field of Classification Search
      CPC ........ B65D 88/129; B60P 1/6409; B60P 3/40; B65G 1/14; E21B 19/15; A47B 57/045; B63B 25/002; B63B 25/28
      USPC ............. 410/31, 32, 36, 42; 211/150, 126.6; 220/1.5
      See application file for complete search history.

(56) References Cited

U.S. PATENT DOCUMENTS

| | | | |
|---|---|---|---|
| 4,712,691 A | | 12/1987 | Grill et al. |
| 7,402,014 B2 * | | 7/2008 | de Jong ................. B65G 57/28 |
| | | | 410/31 |
| 8,844,737 B2 * | | 9/2014 | Bukowski ............... D06F 57/12 |
| | | | 211/100 |
| 2008/0023470 A1 * | | 1/2008 | Bradford ................ B65D 19/18 |
| | | | 220/1.5 |
| 2011/0062301 A1 | | 3/2011 | Sloan |

FOREIGN PATENT DOCUMENTS

| | | |
|---|---|---|
| EP | 3260651 A1 | 12/2017 |
| ES | 2198174 A1 | 1/2004 |
| FR | 2152446 A1 | 4/1973 |
| GB | 2068215 A | 8/1981 |
| JP | H082525 A | 1/1996 |
| SE | 146893 C1 | 9/1954 |

OTHER PUBLICATIONS

International Search Report/Written Opinion in related/corresponding PCT Application No. PCT/SE2018/050749 dated Jul. 7, 2018.

International Preliminary Report on Patentability dated Jun. 26, 2019 issued in corresponding/related International Application No. PCT/SE2018/050749.

* cited by examiner

Fig. 1 (Existing art)

Fig. 2 (Existing art)

LOGISTICS ARRANGEMENT AND METHOD FOR UNLOADING OBJECTS FROM A LOGISTICS STAND COMPRISING A PLURALITY OF LOGISTICS ARRANGEMENTS

TECHNICAL FIELD

This disclosure relates to logistics arrangements, especially to arrangements and methods for loading and unloading objects at transportation and storage.

BACKGROUND

In modern society goods, such as various products and material is widely transported, e.g. from manufacturers to warehouses, storages and shops. Logistics solutions typically include transports of goods in freight containers with cargo ships or on land by railways or road transport.

In order to ensure that goods reliably and effectively reach its destination without being damaged, it will be carefully packaged and placed in freight containers before being transported. Large objects may require a substantial amount of packing or wrapping material, e.g. wooden boxes of bubble wrap made of plastics. Production of packaging materials requires substantial amount of material itself and give rise to environmental footprints. In addition, used packaging material is often handled as waste.

In order to reduce the amount of packing material used, and to effectively handle objects at transport and storage, large objects may be loaded on specific logistic stands.

FIG. 1 illustrates an object 100 which is placed on a shelf of a logistics stand 120.

It is a challenge to find solutions for improving efficiency and security in logistics systems.

SUMMARY

It would be desirable to improve efficiency when unloading objects in logistics systems. It is an object of this disclosure to address at least one of the issues outlined above.

Further there is an object to provide a mechanism that enables a logistics arrangement to be forced into a standby position by a lift-movement of a lower located object. These objects may be met by an arrangement according to the attached independent claims.

According to a first aspect, a logistics arrangement for carrying objects is provided. The logistics arrangement comprises an arm adapted to be pivotably attached to a stand i.e. a logistics stand. The arm comprises a support member adapted to carry an object, when the arm is substantially horizontally directed in a storage position, and a pivoting means adapted to pivotably attach the arm to the stand, i.e. the logistics stand, such that the arm is enabled to pivot between the storage position and a standby position where the arm is substantially vertically directed. The arm also comprises a stop member adapted to together with the stand, i.e. the logistics stand, hold the arm in the storage position, when the arm is pivoted into the storage position. The support member is connected with the stop member and the connecting means, and the arm is configured to be forced into the standby position by an upwards directed lift-movement of another lower located object, during unload of the lower located object from the stand, i.e. the logistics stand.

It is to be noted that the term "connecting means" used was a writing mistake, and that pivoting means instead was mentioned to be used, which is easily understood from the context of this disclosure.

According to a second aspect, a logistics stand is provided which comprises a plurality of logistics arrangements according to the first aspect. The logistics arrangements are arranged in pairs, wherein for each pair of the logistics arrangements, the arms the pair of the logistics arrangements are adapted to carry a respective object when the arms are in the storage position, and wherein the arms of the pair are configured to be forced into their respective standby position, by the upwards directed lift-movement of the another lower located object during unload.

According to a third aspect, a logistics system is provided which comprises a freight container, and at least one logistics stand according to the second aspect, wherein the freight container comprises an openable roof, and is configured to enable objects carried by logistics arrangements of the logistics stand to be unloaded from above and when the openable roof is opened.

According to a fourth aspect, a method for unloading objects from a logistics stand is provided. The logistics stand comprises a plurality of logistics arrangements arranged in pairs, wherein each pair of the logistics arrangements is adapted to carry a respective object, and wherein each of the plurality of logistics arrangements comprises a respective arm pivotably connected with the logistics stand The method comprises: grabbing, with a lift arrangement, an object carried by the arms of a pair of the logistics arrangements, when the arms of the pair are substantially horizontally directed in a storage position; lifting the grabbed object upwards; and forcing the arms of a further pair of logistics arrangements, related to an already unloaded object, to pivot into a standby position where the arms of the further pair are substantially vertically directed. In the method, the action of forcing the arms of the further pair of logistics arrangements is caused by the action of lifting the grabbed object.

By designing a logistics arrangement as described, unloading of objects from logistics stands may effectively be made by direct upwards directed lift-movement. Thereby, when the logistics stands are transported or stored in freight containers, there may be no need for rolling out the logistics stands from the containers before unloading the objects, which may improve efficiency at unloading further. This may be further advantageous and enable that single objects may unloaded at different occasions and that remaining objects do not have to be rolled out and rolled in again.

BRIEF DESCRIPTION OF DRAWINGS

The solution will now be described in more detail by means of exemplifying embodiments and with reference to the accompanying drawings, in which.

DETAILED DESCRIPTION

Figure 1:
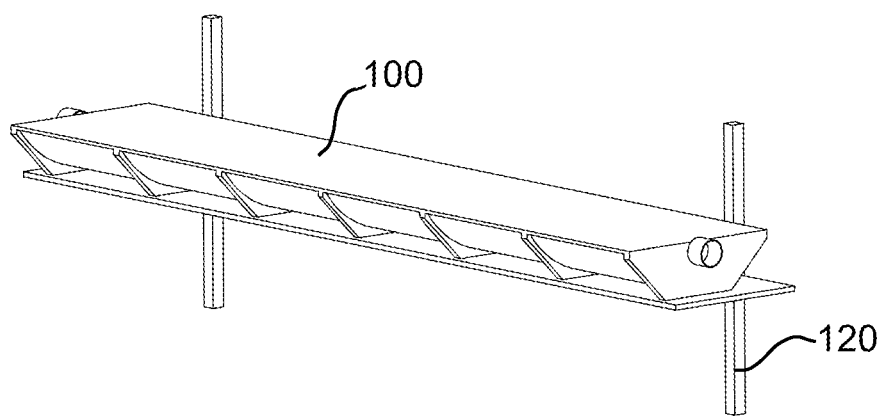
FIG. 1 is a schematic environmental illustration of an arrangement in accordance with existing art.
Figure 2:
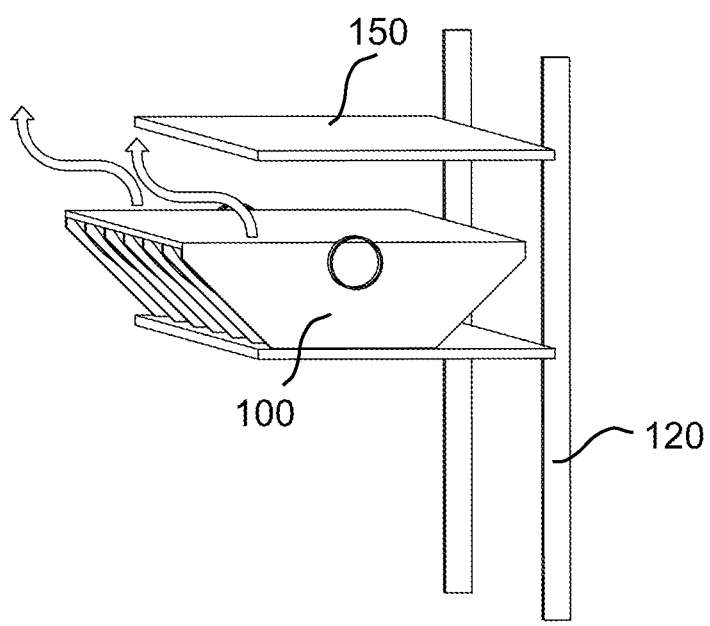
FIG. 2 is a schematic environmental illustration of an arrangement in accordance with existing art.

With reference to FIG. 2, which is a schematic overview illustration, a prior art process of unloading an object 100 which is stored on a shelf 150 of a logistics stand 120 will now be described. In this example, the object 100 is a concentrating solar collector of PTC (Parabolic Trough Collector) type. In order to effectively transport or store objects, they may be loaded above each other on respective shelfs 150. To unload such a stored object 100, it has to be carefully grabbed before being moved from its shelf 150. Thereafter, it may be lifted upwards. Thus, the object 100 must change direction and may describe a complicated movement, which is illustrated by the unfilled arrows.

However, in order to effectively transport objects on a stand, i.e. a logistics stand, in a freight container, there is too little space for moving the objects horizontally out from the shelf because the container wall will be located to close. Therefore, the whole logistics stand 120 has to be moved out from the freight container before unloading can start, which reduces effectivity when unloading.

In order to achieve effective unloading, this disclosure will disclose a solution where the objects instead may be directly unloaded with an upwardly directed lift-movement from the logistics stand. As will be further disclosed, this may be enabled by arranging pivotably attached logistics arrangements with arms configured to carry the objects, where the arms will be forced into respective standby positions and leave a free passage for lower located objects.

Figure 3:
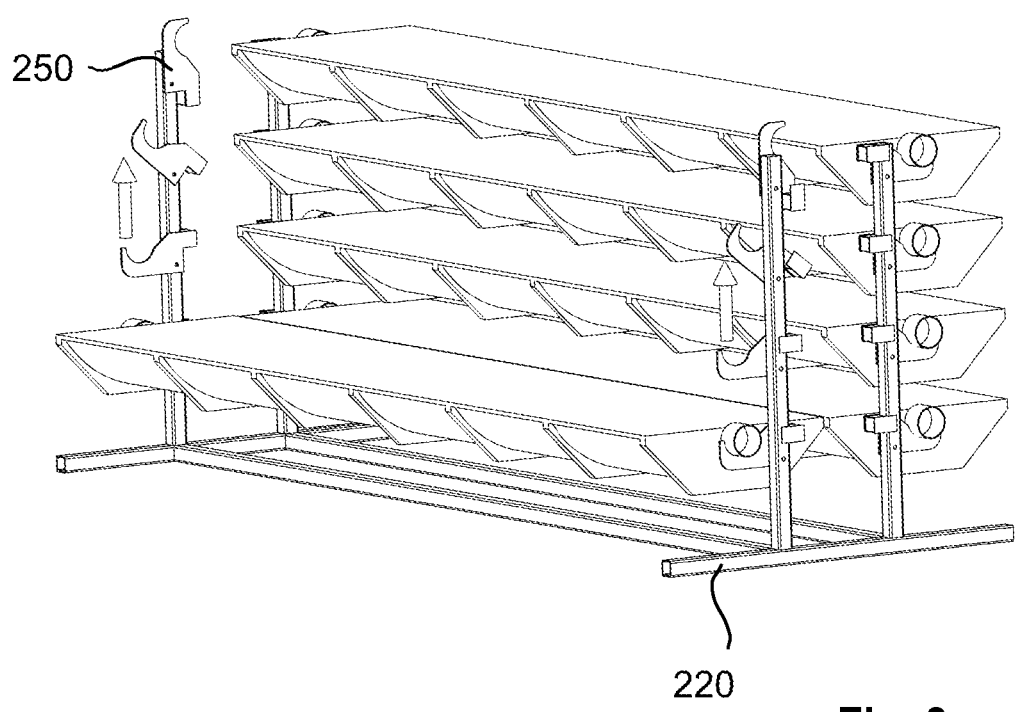
FIG. 3 is a schematic illustration of an arrangement, according to a possible embodiment.

With reference to FIG. 3, which is a schematic overview illustration, a logistics arrangement 250 will now be described in accordance with one exemplifying embodiment. In FIG. 3 a logistics stand 220 is illustrated. The logistics stand 220 is loaded with a plurality of objects. In this exemplifying embodiment, the loaded objects are exemplified as PTC:s (Parabolic Trough Collectors), i.e. concentrating solar collectors configured to concentrate direct solar radiation on a receiver tube through which a cooling liquid is transported.

However, the disclosed concept is not limited to logistics for PTC:s, but could also be applied in conjunction with storage and transport of objects in general, e.g. transport of various products and materials. The PTC:s are carried by a pair of logistics arrangements 250 and carried by respective arms of the logistics arrangements 250.

The logistics arrangements 250 are pivotably attached to the logistics stand 220 and, as seen in the figure, the respective arms could alternate between a storage position and a standby position. In the storage position, the arms are horizontally directed such that a pair of arms may carry a PTC. In the standby position, instead the arms are vertically directed such that the arms are swung away in order not to prevent a vertical lift-movement of lower located PTC:s.

Furthermore, in FIG. 3, unfilled vertical arrows illustrate how the lift-movement forces the arms of above located logistics arrangements 250 to pivot into their respective standby positions.

It is to be noted that the terms horizontally directed and vertically directed should be broadly interpreted and merely mean substantially horizontally directed and substantially vertically directed respectively, as will be further discussed below.

Figure 4:
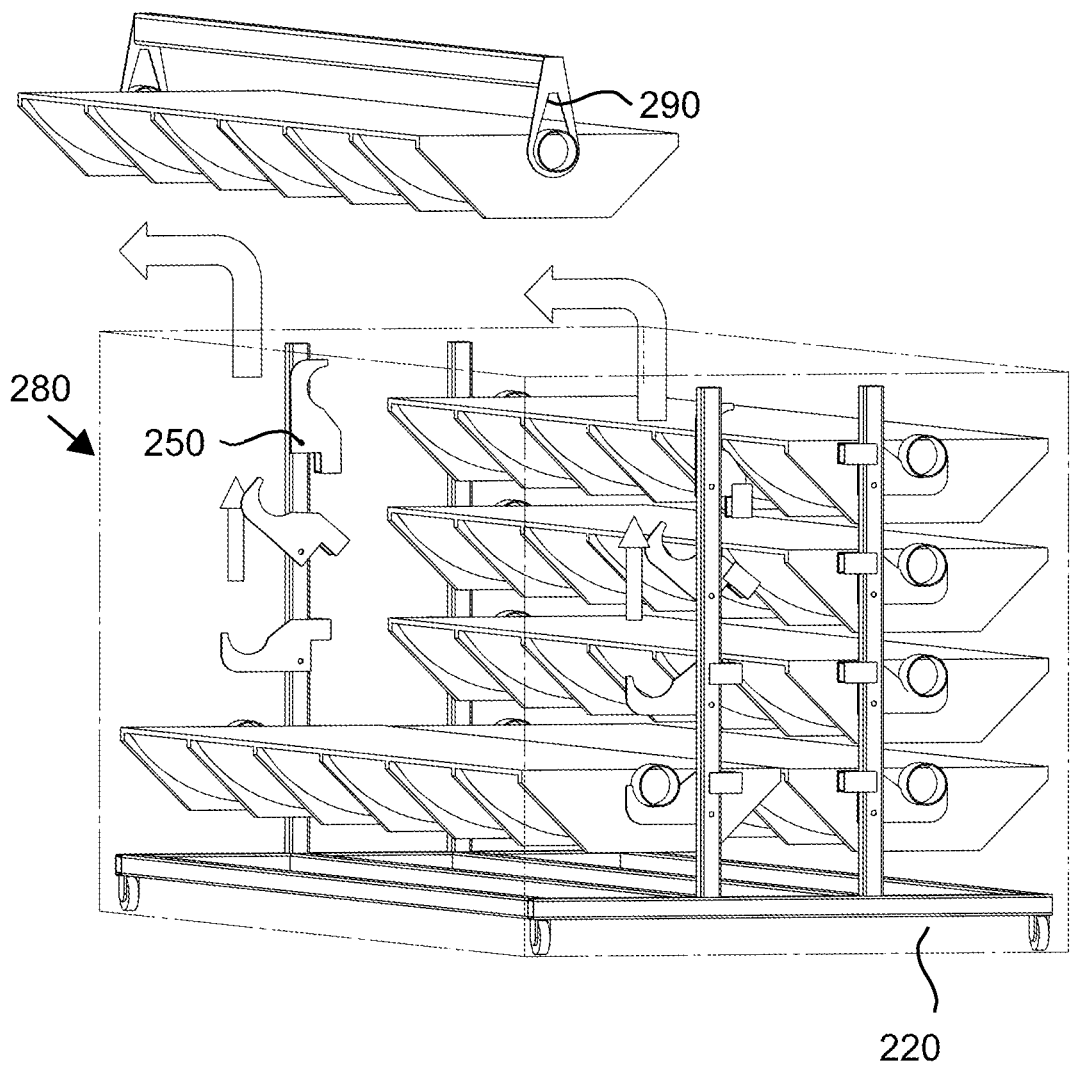
FIG. 4 is a schematic illustration of an arrangement, according to a possible embodiment.

With reference to FIG. 4, which is a schematic overview illustration, a logistics system will now be described in accordance with one exemplifying embodiment. The logistics system comprises a freight container 280 and a logistics stand 220. The logistics stand 220 is similar with the logistics stand described above in conjunction with FIG. 3 and the same reference numbers will therefore be applied where appropriate.

The freight container 280 is indicated with dash-dotted lines and is of standard size for shipping, e.g. a 20 foot container. However, the freight container 280 of this exemplifying embodiment is of a type called open top container with an openable roof, which typically are made of a hard material such as metal or a soft material such as tarpaulin.

FIG. 4 illustrates how one PTC is unloaded from the freight container 280. A lift arrangement 290 has grabbed a PTC and with a lift-movement the PTC is moved upwards through a top opening of the freight container 280, before being moved to another location, e.g. where it will be installed. As earlier described above in another embodiment and in conjunction with FIG. 3, unfilled vertical arrows illustrate how the lift-movement forces the arms of above located logistics arrangements 250 to pivot into their respective standby positions. As illustrated, the distance between the logistics arrangements 250 is selected to let the outer parts of the PTCs extend outside the support members of the arms to be accessible for the lift arrangement 290 to enable reliable grabbing of the PTCs. Then, when lifting the PTCs, ungrabbed portions located under the above located logistics arrangement 250 forces them to swing up.

Thus, because the logistics stand illustrated in FIG. 3 and described in conjunction with the corresponding embodiments is configured to enable objects (e.g. PTCs) to be unloaded by being lifted upwards, also the logistics system described in conjunction with FIG. 4 will be configured for enabling such horizontal directed unloading.

In another exemplifying embodiment, which is based on the above described one, the logistics stand 220 is further equipped with parallel beams extending along its length to form a rectangular bottom structure that fits into the freight container 280. These parallel beams may be used to immobilise the logistics stand 220 in the freight container 280. In addition, the bottom structure may be equipped with wheels in its corners to facilitate loading the freight container 280 by rolling the logistics stand 220 into the freight container 280 from a side, e.g. a short side. Thereby, the logistics stand 220 may effectively be filled with PTC:s before being introduced in the freight container 280.

It is to be noted that even if some of the above described embodiment examples are described for freight containers, the inventive concept is not limited thereto. The present solutions may with advantage be implemented also for logistic stands outside freight containers. The proposed solution achieves than a less complex movement of objects when being unloaded. For instance, in comparison with FIG. 2 where the objects are stored on shelfs, the movement is directed in one direction such that dangling could be avoided. Thereby risks for injuries of persons or damage of objects will be decreased and a safer logistics process will be achieved.

With reference to the FIGS. 5a-c, which are various schematic views, some logistics arrangements 250 will now be described in accordance with respective exemplifying embodiments.

Figure 5B:
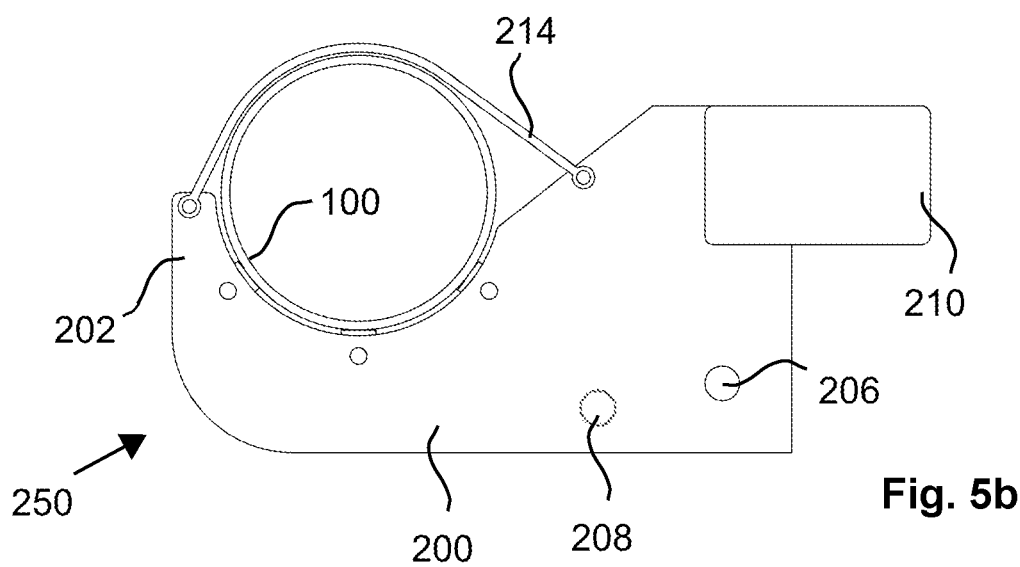
FIGS. 5a-c are schematic illustrations of arrangements, according to possible embodiments.
Figure 5A:
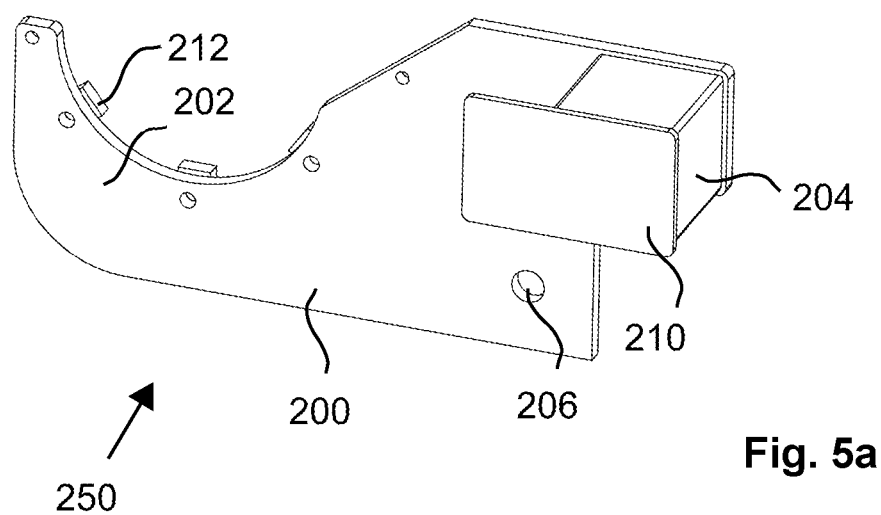

A logistics arrangement 250 is illustrated in FIG. 5a. The logistics arrangement 250 comprises an arm 200 which is adapted to be pivotably attached to a stand 220. The arm 200 comprises a support member 202 which is adapted to carry an object (not referred to) when the arm 200 is substantially horizontally directed. In such a storage position, the support member 202 is configured to reliably hold the object, e.g. a PTC. In this embodiment, the support member 202 is designed as a hook that fits a drum of the object. Optionally, the support member 202 may be provided with a bushing 212. By selecting a material of the bushing 212 which has appropriate characteristics, e.g. rubber, the object may be protected from mechanic wear or damages. In addition, the material characteristics of the bushing 212 may damp vibrations and give rise to a more reliable fixation of the object.

The arm 200 also comprises a pivoting means 206 adapted to pivotably attach the arm 200 to the stand 220. By providing the arm 200 with the pivoting means 206, the arm 200 will be enabled to pivot between the storage position and a standby position where the arm 200 is substantially vertically directed. In this embodiment, the pivoting means 206 is implemented as a hole adapted to connect the logistics arrangement 250 to the stand 220 by a bolt which is introduced in the hole and fastened to the stand 220. However, the disclosed concept is not limited to implement the pivoting means 206 as a hole. Alternatively, the pivoting means 206 may be designed as a bolt or pin protruding from the arm 200 and be adapted to be inserted in a corresponding hole of the stand 220, etc.

The arm 200 also comprises a stop member 204 which is adapted to together with the stand 220 hold the arm 200 in the storage position, when the arm has been pivoted into the storage position. i.e. the stop member 204 will prevent the arm from being pivoted further than the storage position. In this embodiment, the stop member 204 is a box like structure which is attached to the structure of the arm 200, and when the box-like structure contacts the stand 220, the arm 200 will be prevented from pivoting further. However, the stop member 204 may be alternatively implemented within the disclosed concept. For instance, instead of a box-like structure, the stop member 204 may be designed as a brim of the arm 200 structure, a pin or a block attached to and protruding substantially perpendicular from the arm 200 structure. By arranging the support member 202, the pivoting means 206 and the stop member 204 as described, the arm 200 will be configured to be forced into the standby position by an upwards directed lift-movement of another lower located object, e.g. another PTC, during unload of the lower located object from the stand 220.

In another exemplifying embodiment, which is based on some above described embodiments, a stabilising member 210 is arranged at the stop member 204 to prevent horizontal movements of the arm 200, i.e. to prevent the arm 200 from twisting about an upright of the stand 220. Thereby, the stabilising members 210 will stabilise the logistics arrangements 250 when being arranged at the stand 220. In this embodiment, the stabilising member 210 is designed as a plate which abuts one side of an upright of the stand 220, the upright having a rectangular cross section. The arm 200 structure itself abuts an opposite side of the upright when the arm is in the storage position. Thereby, by means of the arm 200 structure, and the stabilising member 210, the logistics arrangement 250 will be prevented to twist about the rectangular formed, i.e. square, cross section of the upright. It is understood that the stand 220 referred to in this exemplifying embodiment and with reference to FIG. 5a is a logistics stand corresponding to the logistic stands referred to on other places in this disclosure.

FIG. 5b illustrates another exemplifying embodiment, which is related to some embodiments described above and illustrated in FIG. 5a.

This embodiment differs in that the logistics arrangement 250 further comprises a fastening means 214 which fixates an object 100 to the logistics arrangement 250. In FIG. 5b, the object 100 is illustrated as a drum of a PTC. The fastening means 214 may be implemented as a strap or a wire to be fastened to the logistics arrangement 250.

The FIG. 5b also illustrates a locking means 208 which may be arranged at any of the exemplifying embodiments of this disclosure to lock the arm 200 of the logistics arrangement 250 in its standby position. In this exemplifying embodiment, the locking means 208 is implemented as a hole configured to have a pin or bolt received before the pin or bolt is being further inserted in a corresponding hole of an upright of the logistics stand 220.

Figure 5C:
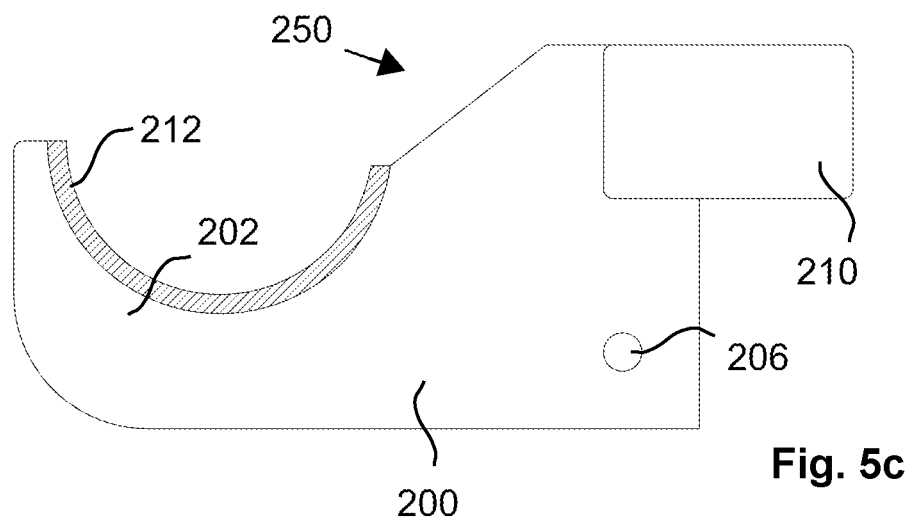

FIG. 5c illustrates another exemplifying embodiment, which is related to some above described embodiments illustrated in FIGS. 5a, and 5b, respectively.

In this embodiment, the bushings 212 instead are alternatively configured as an inlay that covers a larger section of the support member 202. By forming the larger inlay type bushing 212 of a softer foam-structured material, the object may be further more stabilised when carried by the logistics arrangement 250.

Figure 6:
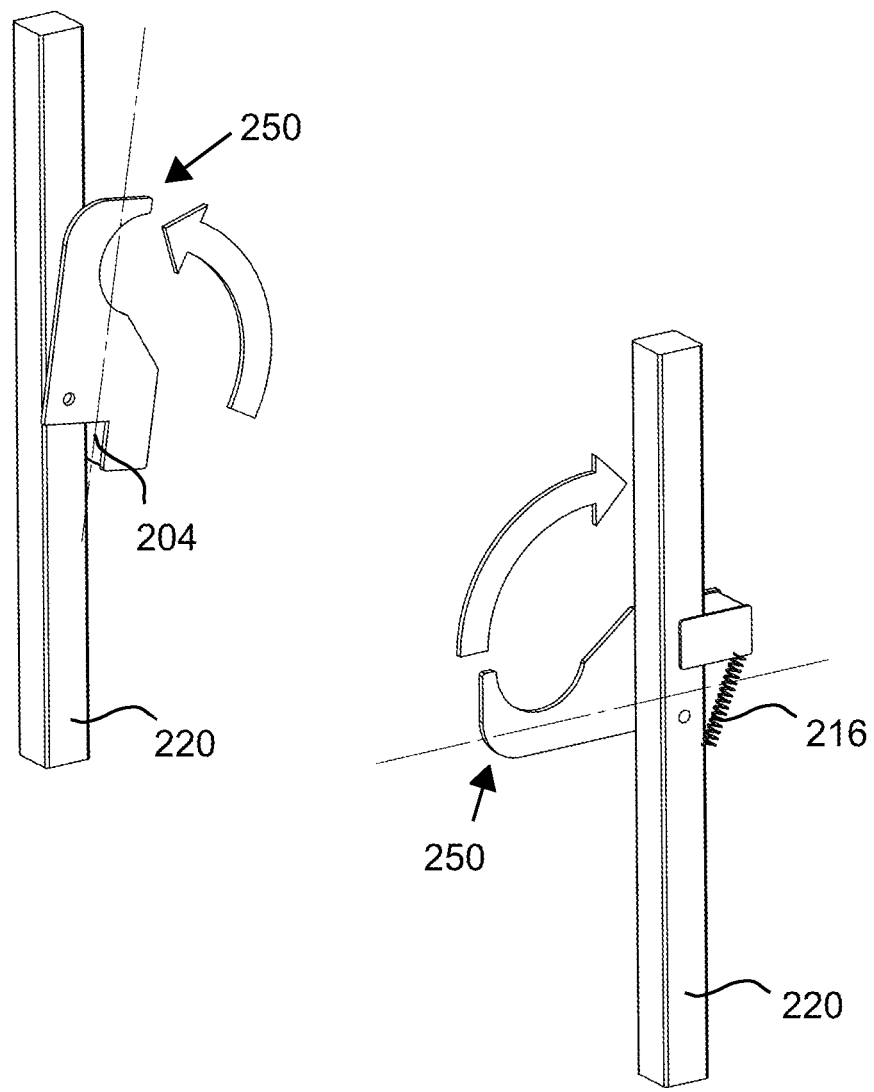
FIG. 6 is a schematic illustration of an arrangement, according to possible embodiments.

With reference to FIG. 6, which is a schematic perspective view, some principles of logistics arrangements 250 will now be described according to one exemplifying embodiment.

The logistics arrangement 250 corresponds to the logistics arrangement described above in some embodiments, and the same reference numbers are therefore applied when appropriate. The logistics arrangements 250 are mounted at respective uprights of a logistics stand 220.

The left logistics arrangement 250 is pivoted to a standby position and its arm is substantially vertically directed. As seen the arm is not strict in parallel with the upright, but differs with a small angle. However, the support member of the arm is reliably pivoted away and will not prevent further objects to be lifted upwards. By arranging the stop member 204 on the opposite side of the support member 202 with respect to the pivoting means 206, the arm 200 may be enabled to swing further such that it does not extend outside the uprights when in standby position. Thereby, a free passage way may be achieved for objects stored at support members of below arranged logistics arrangements, which facilitates unloading of objects, e.g. in narrow spaces such as when a logistics stand fills up a freight container.

Moreover, as seen the stop member 204 stops the arm of the logistics arrangement 250 from pivoting further. Thus, the stop member 204 of this embodiment has double functionality, and will prevent the arm from pivoting further, both in standby position and in support position.

The right logistics arrangement 250 is pivoted to a support position and its arm is substantially horizontally directed. In the figure, an optional spring 216 is arranged to achieve that the arm will be reliably positioned in the standby position, when being forced by a lower located object. The spring 216 may both assist with an additional force when pivoting, and prevent the arm from falling back to the support position.

It is to be noted that even if it in some exemplifying embodiments above is disclosed that the arms are horizontally and vertically directed, in the respective storage and standby positions, the directions do not have to be strict horizontal and vertical. These definitions should be broadly interpreted and merely define that in storage position, the arms are capable to reliably carry stored objects, and in standby position, the arms are pivoted such that they do not prevent another lower located object from being lifted upwards. Thus, in the storage position the arms are substantially horizontally directed, while in the standby position the arms are substantially vertically directed.

Figure 7:
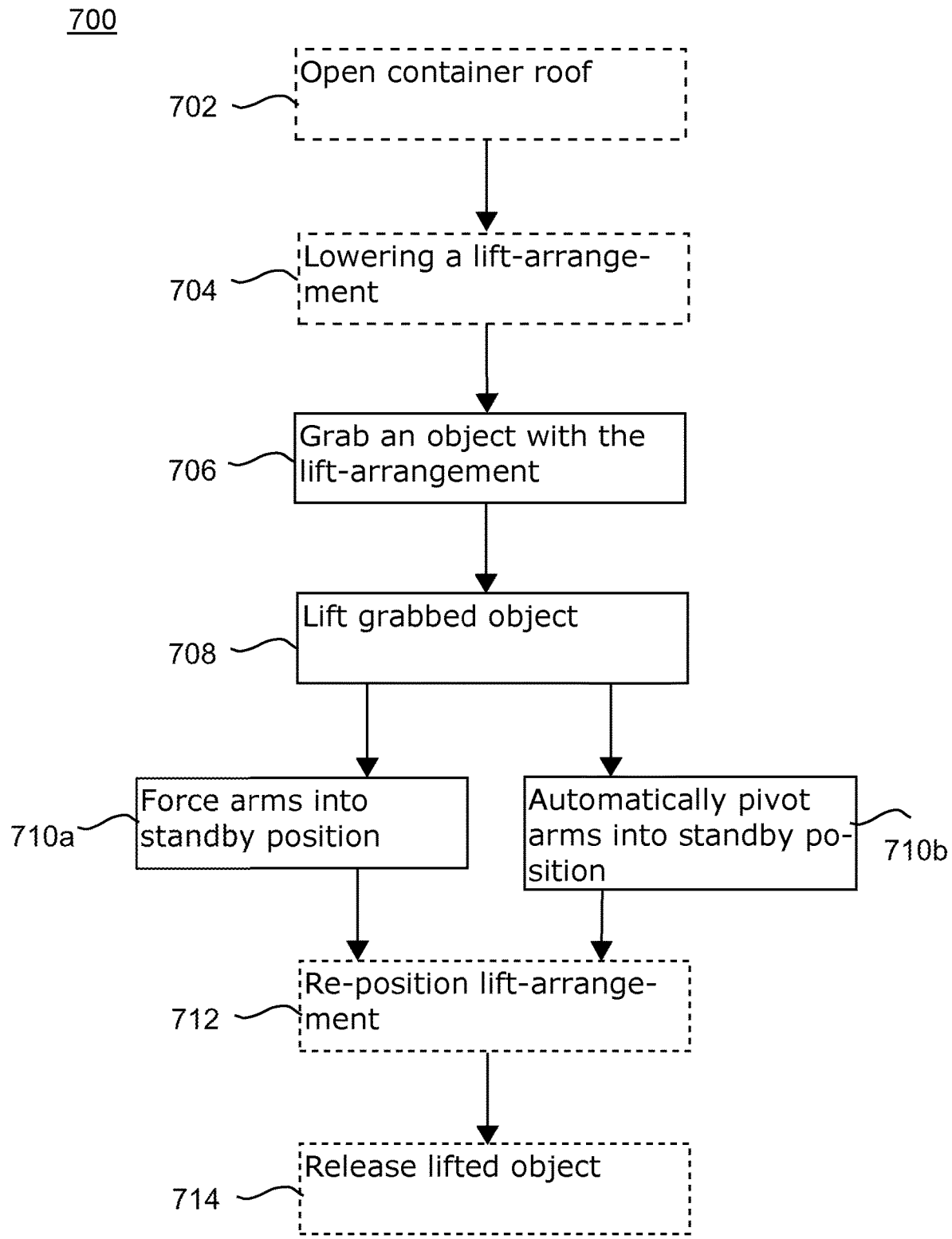
FIG. 7 is a schematic flowchart of a method, according to possible embodiments.

Finally, a method 700 of unloading objects from a logistics stand will now be described in accordance with one exemplifying embodiment, and with reference to FIG. 7, which is a schematic flow chart.

The logistics stand comprises a plurality of logistic arrangements arranged in pairs. Each pair of the logistic arrangements is adapted to carry a respective object and each of the logistics arrangements comprises a respective arm that is pivotably connected with the logistics stand.

In an action 706, an object, e.g. a parabolic trough collector, is grabbed with a lift arrangement, when it is carried by the arms of a pair of logistics arrangements substantially vertically directed in a storage position. It is understood that "vertically" is a writing mistake and that the logistics arrangement instead should have been defined as horizontally directed.

In a following action 708, the grabbed object is lifted upwards, while the arms of a further pair of logistics arrangements are forced to pivot into a standby position, in another action 710a. In the standby position, the arms of the further pair are substantially vertically directed.

In this embodiment, the action 708 of lifting the grabbed object causes the arms of the further pair of logistics arrangement to be forced 710a into the described standby position. From the arms of the further pair of logistics arrangements, another object may earlier have been unloaded, and typically the further pair of logistics arrangements are empty when they are forced into the standby position.

In an alternative exemplifying embodiment, instead of forcing 710a the arms of a further object with the grabbed 706 object while lifting 708, the arms carrying the currently lifted 708 object are automatically pivoted 710b into the standby position. This may be enabled by arranging a spring or a counterweight at the logistics arrangement, similarly as disclosed in conjunction with another embodiment and illustrated in FIG. 6.

For the above described embodiments, the action of forcing 710a or automatically pivoting 710b, may be followed by an action 712 of re-positioning the lift arrangement with the lifted 708 object, and another action of releasing 714 the lifted 708 object. The lifted 708 object may be released at a location where it will be installed, e.g. in an installation of PTC:s.

In another exemplifying embodiment, which may be based on any of the above described embodiments, the action 706 of grabbing the object, is preceded with an initial action 702 of opening a roof of a freight container in which the logistics stand has been loaded, e.g. from a short side of the freight container.

In a following action 704, the lift-arrangement is lowered through a top opening of the opened freight container, before the object is grabbed in the action 706.

Numbered Exemplifying Embodiments (NEEs)

NEE1. A logistics arrangement (250) for carrying objects, the logistics arrangement (250) comprising an arm (200) adapted to be pivotably attached to a stand (220), the arm (200) comprising:
 a support member (202) adapted to carry an object, when the arm (200) is substantially horizontally directed in a storage position,
 a pivoting means (206) adapted to pivotably attach the arm (200) to the stand (220), such that the arm (200) is enabled to pivot between the storage position and a standby position where the arm (200) is substantially vertically directed, and
 a stop member (204) adapted to together with the stand (220) hold the arm (200) in the storage position, when the arm (200) is pivoted into the storage position,
 wherein the support member (202) is connected with the stop member (204) and the connecting means (206), and wherein the arm (200) is configured to be forced into the standby position by an upwards directed lift-movement of another lower located object, during unload of the lower located object from the stand (220).

As stated above, "connecting means" was a writing mistake and pivoting means was mentioned instead.

NEE2. The logistics arrangement (250) according to NEE 1, wherein the stop member (204) is implemented as any of: a block, a brim, and a pin, protruding substantially perpendicular from the support member (202) and is adapted to, in the storage position, contact a corresponding stop member of the stand and preventing the arm (200) from being directed below the horizontal direction.

NEE3. The logistics arrangement (250) according to NEE 1 or 2, wherein the stop member (204) is further adapted to hold the arm (200) in the standby position, when the arm (200) is pivoted into the standby position.

NEE4. The logistics arrangement (250) according to any of the NEEs 1 to 3, further comprising a locking means (208) adapted to, together with a corresponding locking means of the stand (220), lock the arm (200) in the standby position.

NEE5. The logistics arrangement (250) according to any previous NEE, further comprising a stabilizing member (210) adapted to prevent horizontal movements of the arm (200), in the storage position, the stabilizing member (210) being connected with any of the arm (200) and the stop member (204).

NEE6. A logistics stand (220) comprising a plurality of logistics arrangements (250) according to any of the NEEs 1 to 5, wherein the logistics arrangements (250) are arranged in pairs, wherein for each pair of the logistics arrangements (250), the arms (200) the pair of the logistics arrangements (250) are adapted to carry a respective object when the arms (200) are in the storage position, and wherein the arms (200) of the pair are configured to be forced into their respective standby position, by the upwards directed lift-movement of the another lower located object during unload.

NEE7. A logistics system comprising a freight container (280), and at least one logistics stand (220) according to NEE 6, wherein the freight container (280) comprises an openable roof, and is configured to enable objects carried by logistics arrangements (250) of the logistic stand (220) to be unloaded from above and when the openable roof is opened.

NEE8. A method (700) for unloading objects from a logistics stand, the logistics stand comprising a plurality of logistics arrangements arranged in pairs, wherein each pair of the logistics arrangements is adapted to carry a respective object, and wherein each of the plurality of logistics arrangements comprises a respective arm pivotably connected with the logistics stand, the method (700) comprising:
 grabbing (706), with a lift arrangement, an object carried by the arms of a pair of the logistics arrangements, when the arms of the pair are substantially horizontally directed in a storage position,
lifting (708) the grabbed object (706) upwards, and
forcing (710*a*) the arms of a further pair of logistics arrangements, related to an already unloaded object, to pivot into a standby position where the arms of the further pair are substantially vertically directed,
wherein the action of forcing (710*a*) the arms of the further pair of logistics arrangements is caused by the action of lifting (708) the grabbed object (706).

NEE9. The method (700) according to NEE 8, wherein the logistic stand is located inside a freight container having an openable roof, the method (700) further comprising:
opening (702) the openable roof of the freight container, and
lowering (704) the lift arrangement into the opened freight container, before the object will be grabbed (706).

Reference throughout the specification to "one embodiment" or "an embodiment" is used to mean that a particular feature, structure or characteristic described in connection with an embodiment is included in at least one embodiment. Thus, the appearance of the expressions "in one embodiment" or "in an embodiment" in various places throughout the specification are not necessarily referring to the same embodiment. Further, the particular features, structures or characteristics may be combined in any suitable manner in one or several embodiments. Although the present invention has been described above with reference to specific embodiments, it is not intended to be limited to the specific form set forth herein. Rather, the invention is limited only by the accompanying claims and other embodiments than the specific above are equally possible within the scope of the appended claims. Moreover, it should be appreciated that the terms "comprise/comprises" or "include/includes", as used herein, do not exclude the presence of other elements or steps.

Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

The scope is generally defined by the following independent claims. Exemplifying embodiments are defined by the dependent claims.

The invention claimed is:

1. A logistics arrangement for carrying objects when being arranged at a logistics stand, the logistics arrangement comprising an arm adapted to be pivotably attached to an upright of a logistics stand, the arm comprising:
a support member adapted to carry an object, when the arm is substantially horizontally directed in a storage position,
a pivoting means adapted to pivotably attach the arm to the logistics stand, such that the arm is enabled to pivot between the storage position and a standby position where the arm is substantially vertically directed, and
a stop member adapted to together with the logistics stand hold the arm in the storage position, when the arm is pivoted into the storage position, the stop member protruding substantially perpendicular from the arm to contact the logistics stand,
wherein the support member is connected with the stop member and the pivoting means, and wherein the stop member and the support member are located on opposite sides of the pivoting means when the arm is substantially horizontally directed in the storage position, characterised in that the logistics arrangement further comprises a stabilizing member in the form of a plate adapted to prevent horizontal movements of the arm in the storage position by abutting an opposite side of the upright at which the arm is attached, the upright having a rectangular cross section, the stabilizing member being connected with the stop member.

2. The logistics arrangement according to claim 1, wherein the stop member is implemented as any of: a block, a brim, and a pin, protruding substantially perpendicular from the support member and is adapted to, in the storage position, contact a corresponding stop member of the logistics stand and prevent the arm from being directed below a horizontal direction.

3. The logistics arrangement according to claim 1, wherein the stop member is further adapted to hold the arm in the standby position, when the arm is pivoted into the standby position, the stop member being arranged at the arm to contact the logistics stand at a lower location in the standby position than in the storage position.

4. The logistics arrangement according to claim 1, further comprising a locking means adapted to, together with a corresponding locking means of the logistics stand, lock the arm in the standby position.

5. A logistics stand comprising a plurality of logistics arrangements according to claim 1, wherein the logistics arrangements are arranged in pairs, wherein for each pair of the logistics arrangements, the arms of the pair of logistics arrangements are pivotably attached at the same height at respective uprights of the logistics stand and are adapted to carry a respective object when the arms are in the storage position, and wherein the arms of the pair are configured to be forced into their respective standby position, by an upwards directed lift-movement of another lower located object during unload.

6. A logistics system comprising a freight container, and at least one logistics stand according to claim 5, wherein the freight container comprises an openable roof, and the logistics system is configured to enable objects carried by logistics arrangements of the logistics stand to be unloaded from above when the logistics stand is inserted in the freight container and the openable roof is opened.

* * * * *